United States Patent [19]

Jeffrey

[11] 4,130,026
[45] Dec. 19, 1978

[54] POWER TRANSMISSION DRIVE

[75] Inventor: Joseph O. Jeffrey, Ithaca, N.Y.

[73] Assignee: Borg-Warner Corporation, Chicago, Ill.

[21] Appl. No.: 742,808

[22] Filed: Nov. 18, 1976

[51] Int. Cl.² .................. F16G 13/06; F16G 15/12
[52] U.S. Cl. ............................ 74/245 S; 74/250 S; 74/251 S; 74/253 S
[58] Field of Search ............ 74/251 S, 253 R, 255 S, 74/245 S, 250 S, 253 S, 250 R, 251 R, 245 R

[56] References Cited

U.S. PATENT DOCUMENTS

| | | | |
|---|---|---|---|
| 799,073 | 9/1905 | Morse | 74/251 R |
| 1,027,002 | 5/1912 | Richmond | 74/255 S |
| 1,377,268 | 5/1921 | Nelson | 74/235 |
| 1,604,059 | 10/1926 | Matsumoto | 74/235 |
| 1,770,989 | 7/1930 | Morse | 74/353 S |
| 1,819,185 | 8/1931 | Matsumoto | 74/235 |
| 1,849,684 | 3/1932 | Morse | 74/250 S |
| 2,266,688 | 12/1941 | Keller | 74/245 R |
| 3,043,154 | 7/1962 | Karig et al. | 74/253 R |
| 3,213,699 | 10/1965 | Terepin | 74/251 R |
| 3,540,302 | 11/1970 | Bendall | 74/250 R |
| 3,742,776 | 7/1973 | Avramidis | 74/251 S |
| 4,010,656 | 3/1977 | Jeffrey | 74/251 S |

FOREIGN PATENT DOCUMENTS

| | | | |
|---|---|---|---|
| 1146316 | 3/1963 | Fed. Rep. of Germany | 74/245 R |
| 645727 | 7/1928 | France | 74/251 S |
| 235616 | 6/1925 | United Kingdom | 74/245 |
| 260510 | 11/1926 | United Kingdom | 74/251 S |

*Primary Examiner*—Samuel Scott
*Assistant Examiner*—William R. Henderson
*Attorney, Agent, or Firm*—Aubrey L. Burgess

[57] ABSTRACT

A power transmission drive comprising driving and driven sprockets interconnected by a chain consisting of interlaced ranks of links having projecting toes to engage the walls of the sprocket teeth and articulated by two-part pivots disposed transversely through aligned apertures in the links, the cross-section of each pivot part being similar and generally equilateral about axes 120° apart and the apertures being elongated in the direction of the link length. The pivot parts comprise a pin and a rocker each of which has three convex and three concave surfaces which alternate and are joined with one another. A convex surface of the pin and rocker meet in rocking engagement with one another.

12 Claims, 4 Drawing Figures

U.S. Patent  Dec. 19, 1978  Sheet 1 of 3  4,130,026
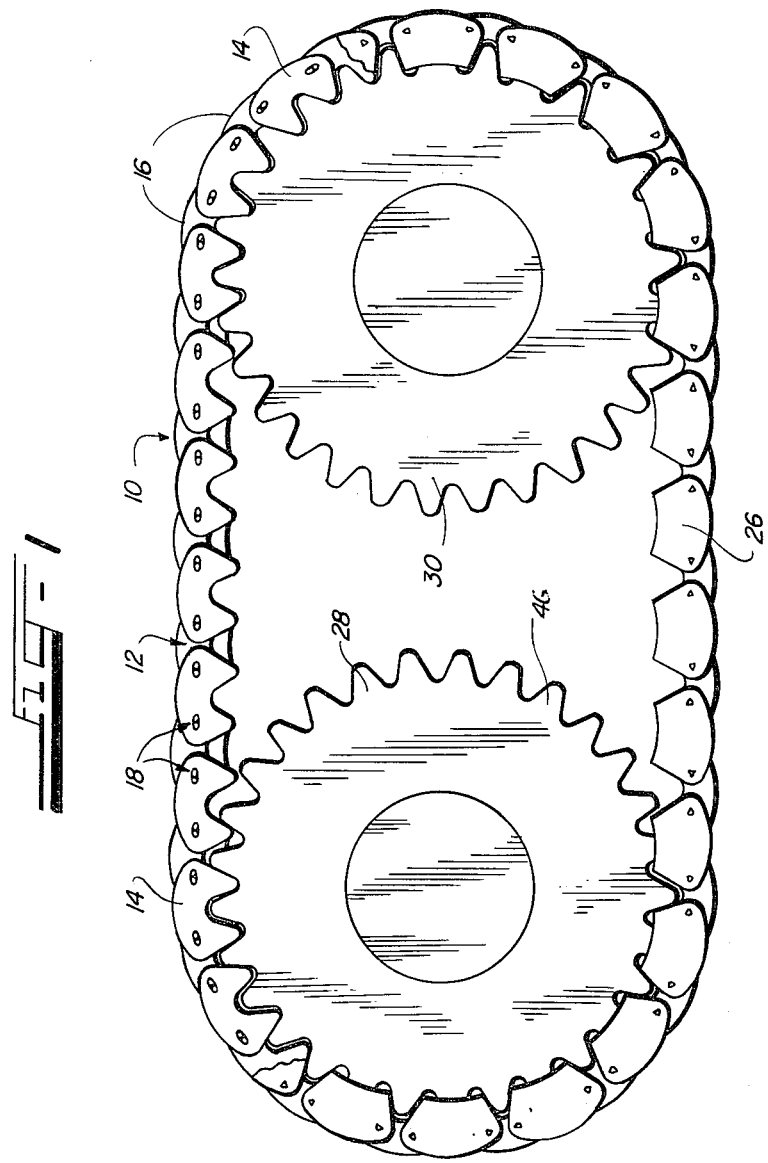

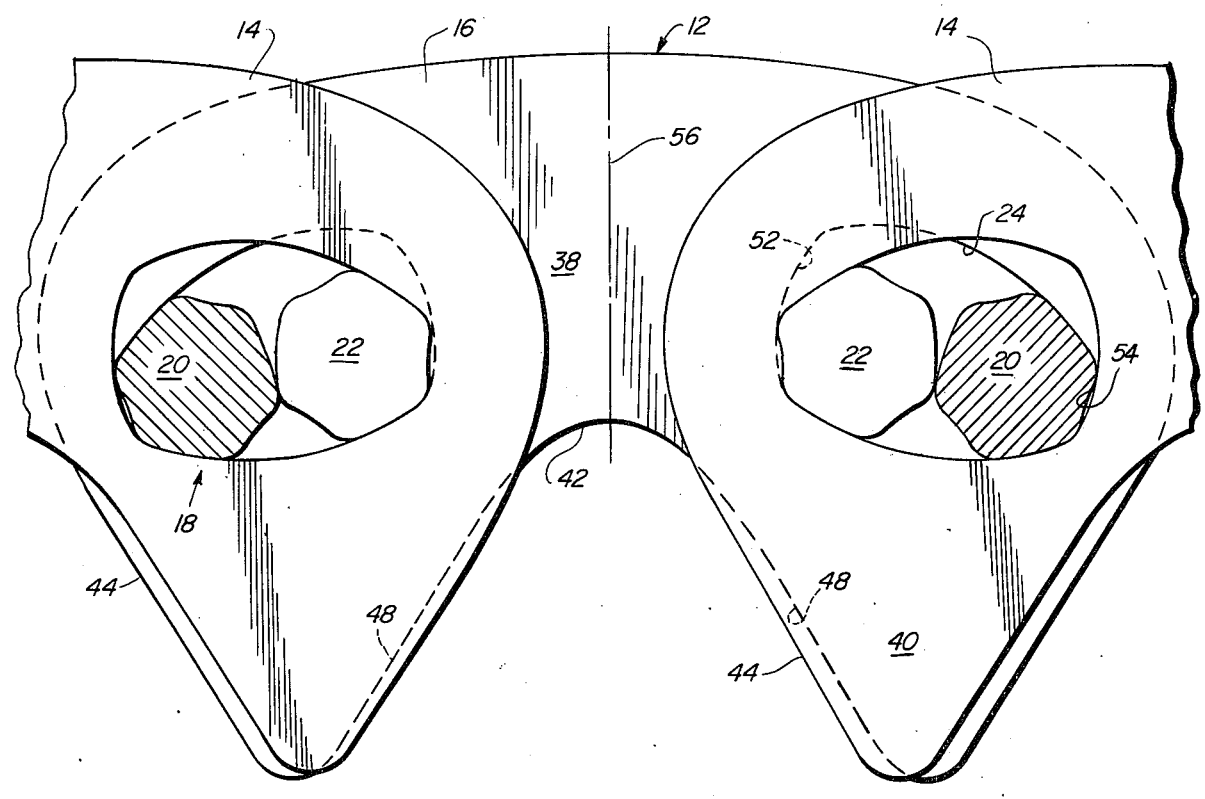

POWER TRANSMISSION DRIVE

BACKGROUND OF THE INVENTION

In the early history of power transmission chain, inverted tooth or silent chain was constructed of sets of links connected together at articulating joints by circular pins. Later, the pin was replaced with a two-part joint comprising a pin and a rocker having abutting surfaces, one of which is rockable on the other. Various configurations of pins and rockers have been suggested in the prior art. For example, U.S. Pat. No. 3,213,699, granted to Terepin describes a pin and rocker joint constructed with pins and rockers substantially identical to each other in section. Each pin and rocker taught by the Terepin patent has an arcuate rocking surface, and an arcuate back surface substantially concentric with the rocking surface. When assemblying a chain with such a pin and rocker configuration, it is possible by rotating a pin or rocker through 180°, to improperly position it in the link apertures. This may not be detected upon inspection, and leads to early chain failure and improper operation. Because each of these components has only one rocking surface suitable for rocking engagement with the other, when this surface becomes worn, both components must be replaced.

A later U.S. Pat. No. 3,742,776 granted to Avramidis describes a chain in which the pin and rocker elements are substantially identical in section which are "wedged" into the apertures.

Still another advance is described in application Ser. No. 440,440, filed Feb. 7, 1974, entitled "Power Transmission Drive" issued Mar. 8, 1977 as U.S. Pat. No. 4,010,656. The chain of this application is characterized by having convex hypotrochoid pins and rockers of substantially similar section which are received in ovate or egg-shaped, elongated apertures in the links. The small end of the aperture receives a pin or rocker, as the case may be, in seated engagement.

THE INVENTION

According to the the present invention, a two part pivot comprising a pin and a rocker is used for connecting sets of links of an inverted tooth power transmission chain. In the preferred embodiment, the cross-section of each pin and rocker is similar, if not identical, in shape and area and is of an equilateral, six lobed configuration. The section can be described as a modified convex hypotrochoid, the modification comprising generally concave surfaces in lieu of the lobes of the hypotrochoid. More particularly the pins and rockers are characterized as having three generally equal convex surfaces of a first, major radius and alternate, generally equal, concave surfaces of a second radius, the adjacent surfaces being joined by additional, small radius surfaces. One of each of the major and minor surfaces are opposite one another and these have a common center, making a convex and concave surface concentric with one another. Each pin and rocker section is symmetrical about axes 120° from each other. The pin and rocker can be placed in any of three correct general orientations relative to one another for assemblying the links.

The apertures are generally elongated, similar to an ovate one having a large and a small end with the small end being shaped to present a convex surface matching the small minor surface of the pin. The adjoining side walls match the curvature of the major pin or rocker surfaces. The apertures are thus so designed that a pivot part seats against the smaller end surfaces thereof.

Because the arcuate concave seat is designed to be concentric with the arcuate convex rocking faces of the joint parts, the force between the link aperture wall and the pin or rocker seat is always in line with the force between the rocking faces, thereby minimizing wear or fretting of the interface between the aperture wall and the joint elements.

Another important factor is the ease of manufacture of the pivot parts which can be cold drawn from circular or rectangular shaped stock.

THE DRAWINGS

FIG. 1 is an illustration of a drive system comprising drive and driven sprockets interconnected by a silent chain of this invention;

FIG. 2 is a top view of a chain according to this invention;

FIG. 3 is an enlarged partial illustration of a link and pivot parts according to this invention taken along line 3—3 of FIG. 2.

DETAILED DESCRIPTION

Figure 4:
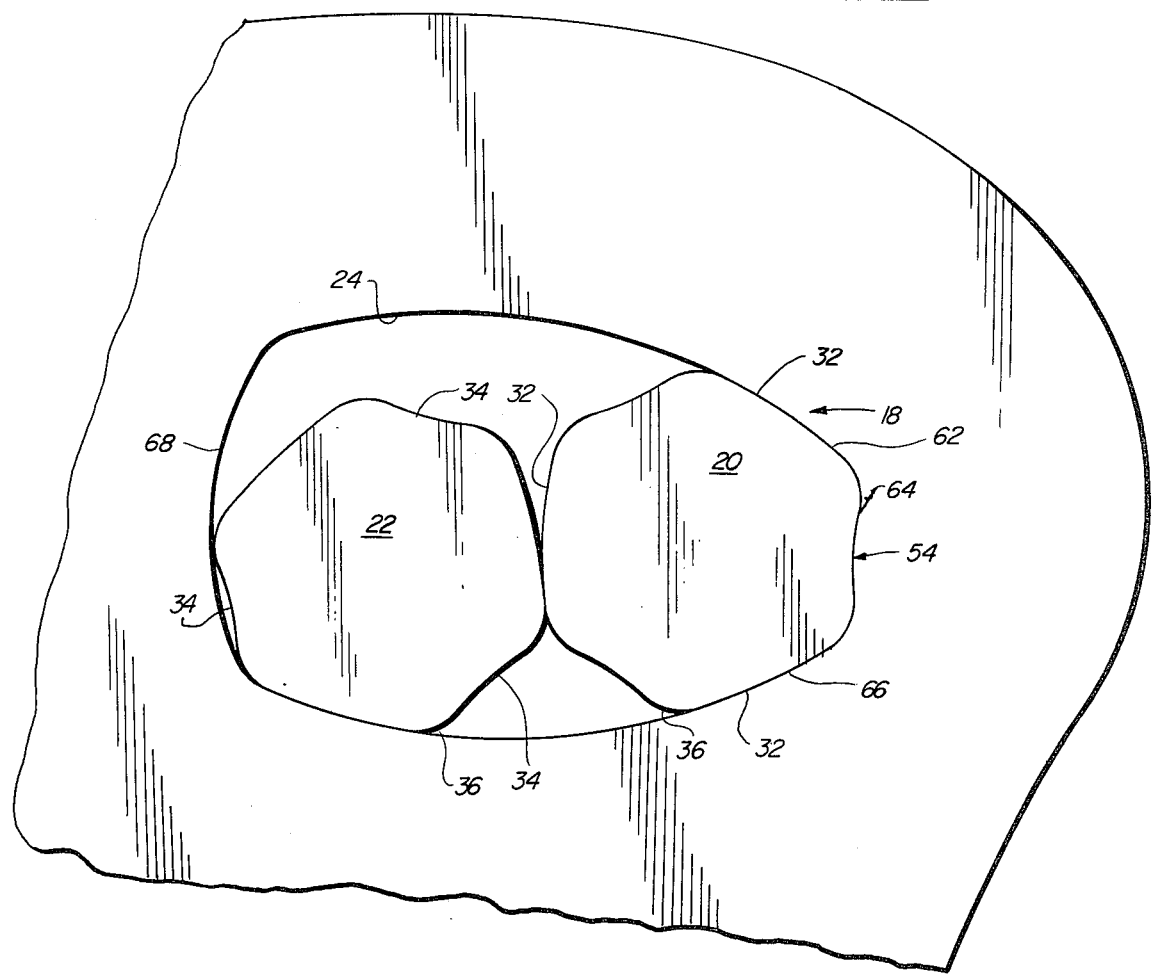
FIG. 4 is an illustration of a link aperture for use with the pivot parts of this invention.

Turning now to the drawings, there is illustrated a chain 10 comprising a plurality of identical inverted tooth links 12 assembled as alternate, interlaced sets of links 14 and 16, the links in each set being aligned with one another. The sets of links 14 and 16 are interconnected by pivot parts generally identified as 18 comprising a pin 20 and a rocker 22, each substantially similar, if not substantially identical, in section. The guide links 26 flank the assembled sets of links to position the chain on a driver and driven sprockets 28, 30, respectively (see FIG. 1). In an alternative construction, inside guide links (not shown) may be used to position a chain on a grooved sprocket. The pin 20 is longer than the rocker 22 and may be peened over at its ends to retain the assembled links. Alternately, the pin 20 may be provided with means to receive a cotter pin or the like to retain the assembled links in position.

The only dimensional difference between a pin and a rocker is the length; the only functional difference between a pin and a rocker is that the pin functions to hold the chain together laterally. The pin and rocker can thus be referred to collectively as pivot parts for ease of explanation.

In the preferred embodiment, each pivot part is similar, if not substantially identical in cross-sectional shape and area. Each basically has six arcuate i.e., three convex surfaces 32, of equal length and three concave surfaces 34 of equal length but different from the lengths of the convex surfaces 32, which surfaces alternate around the pivot part. The adjoining surfaces are joined by small radius surfaces 36, so that a smooth outer surface is presented by the pivot part. If the surfaces 32 (or surfaces 34) are bisected, the pivot part is symmetrical about axes located 120° apart. Thus, in looking at the pivot part in section, it is noted that a surface 32 is opposite a surface 34. Another feature of the pivot part is that the radii of the opposed surfaces 32 and 34 are concentric.

The links 12 of the chain 10 are similar in shape to other silent chain links, at least in outline. In addition to the body 38, each link has a pair of projecting toes 40 joined by a crotch 42. The flanks 44 of the links engage the driving means, such as the walls of the teeth 46 on a sprocket 28 or 30. The inner flanks 48 of the links may or may not engage the driving means. Each of the links has a pair of spaced apertures 24 through which the pivot parts 18 extend. These apertures are elongated in the direction of link length and have one end 52 of greater dimension than the opposite, smaller end 54. Each aperture 24 is positioned in symmetrical relationship to a center line 56 of the link and each is equidistant therefrom. The apertures may also be symmetrical about a centerline therethrough, which centerline may be obliquely oriented to, coincide with, or be parallel to the line of pull of the chain which may be defined as an imaginery line extending from the contact between the pivot parts of one aperture to the contact between the pivot parts of the other aperture when the chain is straight.

The smaller end 54 of the aperture comprises surfaces 62, 64, and 66 which substantially match a pair of convex surfaces 32 of the pivot part and the concave surface 34 therebetween, and is such to engage the surfaces 32, 34, 32 of the pivot part 18. The pivot part 18 is completely seated in the smaller end 54. The larger end has a smooth, continuous wall 68 and is enlarged to permit the pivot parts 20 or 22 to roll on their engaging convex surfaces 32 to thus permit articulation of the chain. Because the arcuate concave surface or seat 34 (which engages the surface 64) is concentric with the arcuate convex rocking faces 32, 32 of the joint parts, the force between the link aperture wall 64 and the pin and rocker seat or surface 34 is always in line with the force between the rocking faces, thereby minimizing wear or fretting of the interface between the aperture wall and the joint elements. The tendency of a pivot part to wiggle is also reduced.

Because each pivot part has three working surfaces, i.e., the convex surfaces 32, when and if wear is detected on the engaging and rocking surfaces of adjacent pivot parts, the chain can be repinned by rotating one or both pivot parts through 120°, thereby presenting new or fresh rocking surfaces.

I claim:

1. A power transmission chain of the type adapted to cooperatively engage driving means on a rotating member comprising:
   a series of overlapping and interlaced sets of links having aligned apertures formed therethrough, and pivot means positioned in said apertures forming said chain with articulating joints;
   said pivot means comprising a pin and a rocker each of which has three convex and three concave surfaces which alternate and are joined with one another and with a convex surface of each in rocking engagement with one another;
   said apertures having a small end and a large end, said small end being so shaped to receive a concave surface and its flanking convex surfaces in seating engagement.

2. A power transmission chain as recited in claim 1 in which each convex surface is opposed to a concave surface, and each opposed convex and concave surfaces have concentric radii.

3. A power transmission chain as recited in claim 1 in which the lengths of the convex surfaces are equal and the lengths of the concave surfaces are equal.

4. A power transmission chain as recited in claim 3 in which the lengths of the convex surfaces are different from the lengths of the concave surfaces.

5. A power transmission chain as recited in claim 1 in which said apertures are elongated in the direction of link length.

6. A power transmission chain as recited in claim 1 in which said pin and rocker are substantially similar in cross-sectional shape.

7. A power transmission chain as recited in claim 6 in which said pin and rocker are substantially similar in cross-sectional area.

8. A pivot pin and rocker adapted for use only in a power transmission chain which is an assembly of sets of overlapping apertured links interconnected by pivot pins and rockers in the link apertures, each said pivot pin and rocker having three convex surfaces of equal length and three concave surfaces of equal length, the convex surfaces alternating with the concave surfaces and the adjacent surfaces being joined to one another.

9. A pivot pin and rocker as recited in claim 8 in which the length of each said convex surfaces is different than the length of each said concave surfaces.

10. A power transmission chain assembly comprising a series of overlapping and interlaced sets of links having pivot means positioned through aligned apertures formed in said links, each said aperture being elongated with a first end section at one end and a larger end section at the other end, said apertures being arranged in pairs through said links with the first end section being located at the outer ends of the links and the larger ends being located toward the center of the links, said pivot means being formed of a pair of elongated members each of which is substantially similar in crossection and with three convex surfaces and three concave surfaces, which concave and convex surfaces alternate with one another and which alternate surfaces are joined by curves of small radii, one pivot member functioning as a rocker element with respect to one set of links and as a force transmitting pin with respect to the adjacent link, each pin having one of its convex surfaces engaging a surface of the rocker element in rolling contact, each pivot member having one of its concave surfaces and the adjacent joined convex surfaces conforming with the first end section of the apertures in one set of links and tightly seated with said first end section of the apertures in said one set of links.

11. A power transmission chain as in claim 10 wherein each convex surface is opposite a concave surface, said opposite convex and concave surfaces being concentric with one another.

12. A power transmission chain as in claim 11 in which the lengths of the convex surfaces are equal and the lengths of the concave surfaces are equal.

* * * * *